United States Patent
Singh et al.

(10) Patent No.: US 10,430,228 B1
(45) Date of Patent: *Oct. 1, 2019

(54) METHOD AND SYSTEM OF HYDRATING OF VIRTUAL MACHINES

(71) Applicant: Capital One Services, LLC, McLean, VA (US)

(72) Inventors: Bijender Singh, Glen Allen, VA (US); Amit Mawkin, Glen Allen, VA (US); Zachary McAuliffe, Glen Allen, VA (US); Chris Fanis, Glen Allen, VA (US); Sheo Sinha, Henrico, VA (US)

(73) Assignee: Capital One Services, LLC, McLean, VA (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/107,142

(22) Filed: Aug. 21, 2018

Related U.S. Application Data

(63) Continuation of application No. 15/925,339, filed on Mar. 19, 2018, now Pat. No. 10,083,059.

(51) Int. Cl.
*G06F 9/455* (2018.01)
*G06F 8/65* (2018.01)
*G06F 8/71* (2018.01)

(52) U.S. Cl.
CPC ............ *G06F 9/45558* (2013.01); *G06F 8/65* (2013.01); *G06F 8/71* (2013.01); *G06F 2009/4557* (2013.01); *G06F 2009/45562* (2013.01); *G06F 2009/45595* (2013.01)

(58) Field of Classification Search
None
See application file for complete search history.

(56) References Cited

U.S. PATENT DOCUMENTS

2016/0162320 A1  6/2016  Singh et al.
2016/0170792 A1  6/2016  Kato

*Primary Examiner* — Gregory A Kessler
(74) *Attorney, Agent, or Firm* — DLA Piper LLP (US)

(57) ABSTRACT

Embodiments disclosed herein generally relate to a method and system for automatically updating a virtual machine image of one or more virtual machines of an auto-scaling group. A computing system receives an indication to update a virtual machine image of a plurality of virtual machines in a plurality of auto-scaling groups. Computing system identifies a subset of the plurality of auto-scaling groups that contains a hydration tag. Computing system locates a version of the virtual machine image different from a current version of the virtual machine image. For each auto-scaling group in the subset of auto-scaling groups, computing system clones a launch configuration for the virtual machines in the auto-scaling group. Computing system stores data associated with each auto-scaling group in a remote location. Computing system updates the virtual machine image of the virtual machines in each auto-scaling group with the new version of the virtual machine image.

20 Claims, 5 Drawing Sheets

METHOD AND SYSTEM OF HYDRATING OF VIRTUAL MACHINES

CROSS-REFERENCE TO RELATED APPLICATIONS

This application claims priority to U.S. application Ser. No. 15/925,339 filed Mar. 19, 2018, which is hereby incorporated by reference in its entirety.

TECHNICAL FIELD

Embodiments disclosed herein generally relate to a method and system for automatically updating a virtual machine image of one or more virtual machines of an auto-scaling group.

BACKGROUND

Cloud computing, often referred to simply as "the cloud" is the practice of using shared, on-demand computing resources hosted on the Internet on a pay-for-use basis. Cloud computing offers several advantages over traditional data center computing environments, such as the utilization of elastic resources that can be scaled up or down quickly and easily to meet demand. Thus, in recent years, cloud services have rapidly become one of the most adopted technologies in information technology.

SUMMARY

Embodiments disclosed herein generally relate to a method and system for automatically updating a virtual machine image of one or more virtual machines of an auto-scaling group. In one embodiment, a method is disclosed herein. A computing system receives an indication to update a virtual machine image of a plurality of virtual machines in a plurality of auto-scaling groups. The computing system identifies a subset of the plurality of auto-scaling groups that contains a hydration tag. The computing system locates a version of the virtual machine image different from a current version of the virtual machine image. For each auto-scaling group in the subset of auto-scaling groups, the computing system clones a launch configuration for the virtual machines in the auto-scaling group. The computing system stores data associated with each auto-scaling group in a remote location. The computing system updates the virtual machine image of the virtual machines in each auto-scaling group with the new version of the virtual machine image. The computing system launches a new auto-scaling group instance using the cloned launch configuration.

In some embodiments, the launch configurations are unique to each respective auto-scaling group.

In some embodiments, storing data associated with each auto-scaling group to the remote location includes the computer system storing the data in a bucket on a cloud storage platform.

In some embodiments, the new version of the virtual machine image is one of a previous version of the virtual machine image from the current version of the virtual machine image and an updated version of the virtual machine image from the current version of the virtual machine image.

In some embodiments, launching a new auto-scaling group instance using the cloned launch configuration includes the computing system accessing the data stored in the remote location and injecting the data in the new auto-scaling group instance.

In some embodiments, locating the version of the virtual machine image different from the current version of the virtual machine image includes the computing system locating a configuration file mapping all prior and subsequent version of the current virtual machine image and tracing the mapping to one of a prior version of the virtual machine image or an updated version of the virtual machine image.

In some embodiments, launching the new auto-scaling group instance using the cloned launch configuration includes the computing system re-directed traffic from the auto-scaling group to the new auto-scaling group instance.

In some embodiments, launching the new auto-scaling group instance using the closed launch configurations includes the computing system assessing a health of an application executing across virtual machines of an auto-scaling group, determining that the execution exhibits a positive health, and decreasing a number of virtual machines in the new auto-scaling group.

In some embodiments, the computing system further re-allocates resources among the decreased number of virtual machines in the new auto-scaling group instance.

In some embodiments, launching a new auto-scaling group instance using the cloned launch configuration includes the computing system assessing a health of an application executing across virtual machines of an auto-scaling group, determining that the application is exhibiting a negative health, and increasing a number of virtual machines in the new auto-scaling group instance.

In another embodiment, a method is disclosed herein. A computing system receives, from a client device, a set of lambda functions for automatically updating a virtual machine image associated with auto-scaling groups. Each auto-scaling group includes one or more virtual machines. The set of lambda functions includes a first lambda function, a second lambda function, and a third lambda functions. The first lambda function identifies one or more auto-scaling groups that contain a hydration tag. The second lambda function that clones launch configurations associated with each auto-scaling group that includes the hydration tag. The second lambda function re-launches each auto-scaling group according to clone launch configurations such that each auto-scaling group includes a new virtual machine image different from the current virtual machine image. The third lambda function that updates each new auto-scaling group instance with data previously contained in the auto-scaling group. The computing system executes the first, second, and third lambda functions to generate the new auto-scaling group comprising the new virtual machine image. The computing system redirects traffic associated with each auto-scaling group to each corresponding new auto-scaling group.

In some embodiments, executing the first, second, and third lambda functions to generate the new auto-scaling groups comprising the new virtual machine image includes the computing system assessing a health of an application executing across virtual machines of an auto-scaling group, determining that the application is exhibiting a negative health, and increasing a number of virtual machines in the new auto-scaling group instance.

In some embodiments, executing the first, second, and third lambda functions to generate the new auto-scaling groups including the new virtual machine image includes the computing system assessing a health of an application executing across virtual machines of an auto-scaling group, determining that the application is exhibiting a positive health, and decreasing a number of virtual machines in the new auto-scaling group instance.

In some embodiments, executing the first, second, and third lambda functions to generate the new auto-scaling groups including the new virtual machine image includes the computing system accessing the data stored in the remote location and injecting the data in the new auto-scaling group instance.

In some embodiments, the computing system transmits a message to the client device indicating that the virtual machine image has been updated.

In another embodiment, a system is disclosed herein. The system includes a processor and a memory. The memory stores programming instructions, which, when executed by the processor, performs an operation. The operation includes determining that a new version of a virtual machine image of a plurality of virtual machines of an auto-scaling group exists. The operation further includes identifying that the auto-scaling group is a candidate for automatic virtual machine image updates. The operation further includes cloning a launch configuration of the auto-scaling group. The operation further includes storing data associated with the auto-scaling group to a remote server. The operation further includes launching an updated auto-scaling group in accordance with the cloned launched configurations. The updated auto-scaling group includes the new version of the virtual machine image.

In some embodiments, the operation further includes redirected traffic associated with the auto-scaling group to the updated auto-scaling group.

In some embodiments, identifying that the auto-scaling group is a candidate for automatic virtual machine image updates includes identifying that the auto-scaling group includes a pre-designated tag that denotes that the auto-scaling group is a candidate for automatic virtual machine image updates.

In some embodiments, the operation further includes assessing a health of an application executing across the virtual machines of the auto-scaling group. The operation further includes determining that the application is exhibiting a negative health. The operation further includes increasing a number of virtual machines in the updated auto-scaling group instance.

In some embodiments, the operation further includes assessing a health of an application executing across the virtual machines of the auto-scaling group. The operation further includes determining that the application is exhibiting a positive health. The operation further includes decreasing a number of virtual machines in the updated auto-scaling group instance.

BRIEF DESCRIPTION OF THE DRAWINGS

So that the manner in which the above recited features of the present disclosure can be understood in detail, a more particular description of the disclosure, briefly summarized above, may be had by reference to embodiments, some of which are illustrated in the appended drawings. It is to be noted, however, that the appended drawings illustrate only typical embodiments of this disclosure and are therefore not to be considered limiting of its scope, for the disclosure may admit to other equally effective embodiments.

To facilitate understanding, identical reference numerals have been used, where possible, to designate identical elements that are common to the figures. It is contemplated that elements disclosed in one embodiment may be beneficially utilized on other embodiments without specific recitation.

DETAILED DESCRIPTION

Embodiments disclosed herein generally relate to a method and system for automatically updating a virtual machine image of one or more virtual machines of an auto-scaling group. Conventionally, in virtualization platforms, when an update the an image of a virtual machine on the virtualization platform is made public, end users of the virtual machine must manually update the virtual machine to include the updated image. For example, end users would necessarily have to shut down the virtual machine, download the updated image, update the launch configurations associated with the virtual machine to include an ID associated with the image, and re-launch the virtual machine in accordance with the updated launch configurations. Such process becomes tedious, however, in situations where the end user is accessing one or more applications executing across multiple virtual machines. In these circumstances, each virtual machine must necessarily undergo this updating process.

One or more techniques disclosed herein leverage lambda functionality to update the virtual machine image of one or more virtual machines of the auto-scaling group. For example, a virtualization manager may execute one or more lambda functions to carry out automatic updating, or "hydration," of virtual machines hosting one or more applications. Such techniques aid to improve the overall health of the one or more applications by providing an up-to-date image of each virtual machine and assessing an overall health of an application, such that resources can by dynamically added to improve the health of the application without any downtime.

Figure 1:
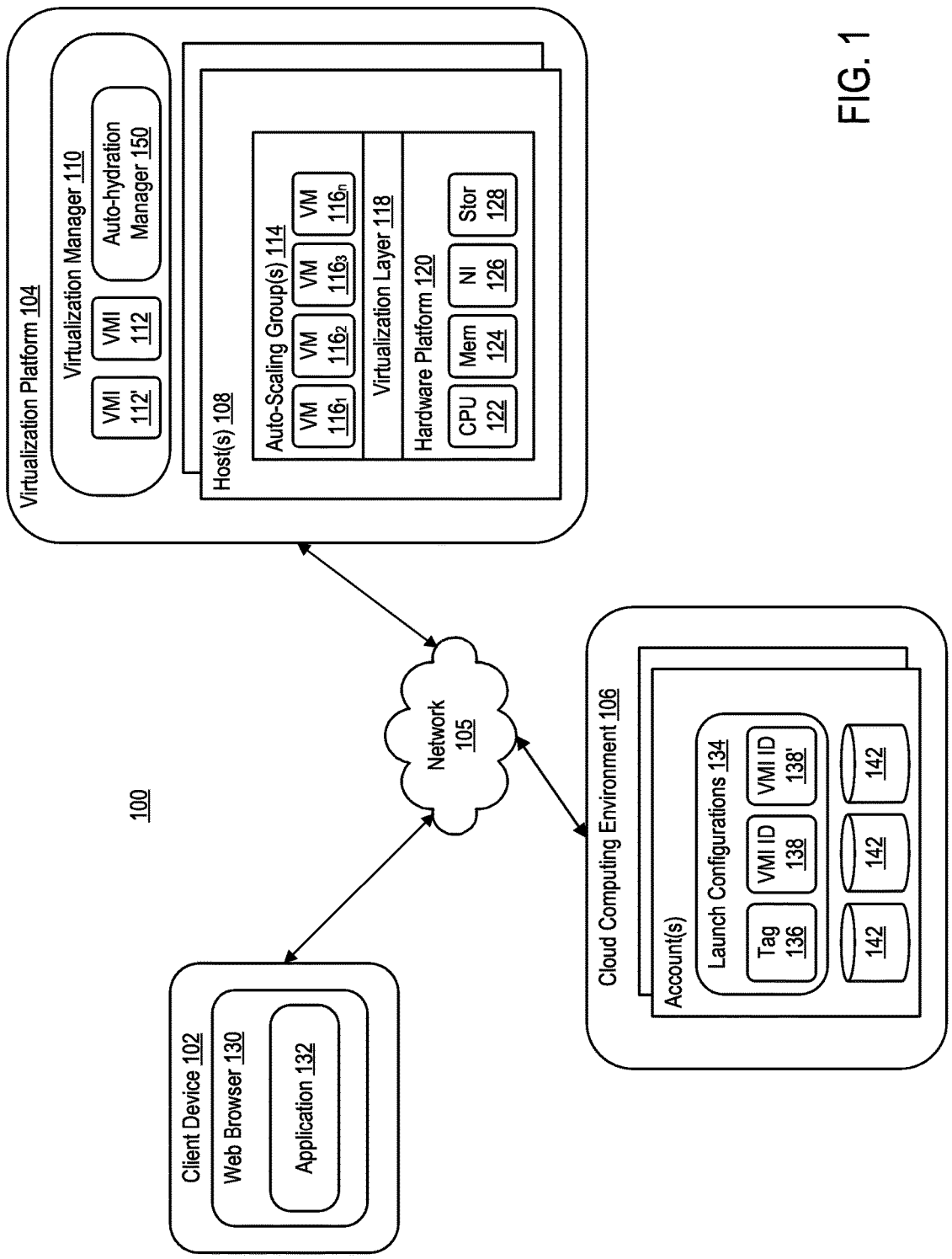
FIG. 1 is a block diagram illustrating a computing environment, according to one embodiment.

FIG. 1 is a block diagram illustrating a computing environment 100, according to one embodiment. Computing environment 100 includes a client device 102, a virtualization platform 104, and a cloud computing environment 106 communicating over network 105. Client device 102 may be operated by user 101. For example, client device 102 may be a mobile device, a tablet, a desktop computer, or any computing system having the capabilities described herein. Client device 102 may execute a web browser 130. Web browser 130 may provide access to an application 132 hosted on virtualization platform 104.

Network 105 may be any suitable network, including individual connections via the Internet (e.g., cellular, wireless networks, etc.). In some embodiments, network 106 may connect terminals, services, and computing devices using direct connections, such as radio-frequency identification (RFID), near-field communication (NFC), Bluetooth™, low-energy Bluetooth™ (BLE), WiFi™, Zig-Bee™, ambient backscatter communications (ABC) protocols, USB, WAN, LAN, and the like. In some embodiments, security concerns may dictate that one or more of these types of connections be encrypted or otherwise secured.

Virtualization platform 102 can include one or more host computer systems ("hosts 108"). Hosts 108 may be constructed on a server grade hardware platform 120. As shown, hardware platform 120 of each host 108 may include components of a computing device, such as one or more processors (CPUs) 122, memory 124, network interface 126, storage system 128, and one or more I/O devices (not shown). Processor 122 is configured to execute instructions, such as programming instructions that perform one or more operations described herein. The programming instructions may be stored in memory 124 or local storage. Memory 124 is a device allowing information, such as executable instructions, virtual disks, configurations, and the like, to be stored and retrieved. Memory 124 may include, for example, one or more random access memory (RAM) modules. Network interface 126 enables host 108 to communicate with another device via a communication medium. Network interface 126 may be one or more network adapters (e.g., network interface card (NIC)). Storage system 128 represents local storage device (e.g., one or more hard disk drives, flash memory modules, solid state disks, and optical disks) and/or a storage interface that enables host 108 to communicate with one or more network data storage systems.

Each host 108 can be configured to provide a virtualization layer 118 that abstracts processor, memory, storage, and networking resources of hardware platform 120 into multiple virtual machines (VM) $116_1$ to $116_n$ that run concurrently on the same host. VMs 116 may run on top of a software interface layer that enables sharing of hardware resources of host 108 by VMs 116. As illustrated VMs 116 define an auto-scaling group 114. Auto-scaling group(s) 114 is a set of VMs 116 that include similar characteristics and that are grouped together for purposes of management and scaling. For example, application 132 may execute across auto-scaling group 114. Depending on the health of application 132, a number of VMs 116 in an auto-scaling group 114 may be increased or decreased dynamically.

Virtualization platform 104 may further include a virtualization manager 110. Virtualization manager 110 may communicate with the plurality of hosts 108 via a network (not shown). In some embodiments, virtualization manager 110 is a computer program that resides and executes in a central server, which may reside in virtualization platform 104. In some embodiments, virtualization manager 110 may run as a VM in one of hosts 108. Virtualization manager 110 may be configured to carry out administrative tasks for virtualization platform 104. For example, virtualization manager 110 may manage hosts 108, manage VMs 116 running within each host 108, provision VMs 116, migrate VMs 116, load balance among VMs 116, and increase or decrease a number of VMs 116 based on a health of an application executing across VMs 116 of auto-scaling group 114.

In some embodiments, virtualization manager 110 may store one or more virtual machine images (VMI) 112, each VMI 112 associated with a given VM 116. VMI 112 may be referred to as a template to create the one or more VMs 116. For example, VMI 112 may include files relating to VM 116, an operating system running thereon, provisioning information, and the like. A specific example of VMI 112 is an Amazon Machine Image ("AMI") on Amazon Web Services (AWS) platform.

Virtualization platform 104 may communicate with cloud environment 106 via network 105. Cloud computing environment 106 may store information associated with a user's virtualization platform 104. For example, cloud environment 106 may include on or more accounts 120. Each account 120 may correspond to a given user. In some embodiments, cloud computing environment 106 may include one or more storage locations (i.e., buckets 142) for storage of information associated with account 120. As illustrated account 120 may correspond to a user accessing client device 102. Account 120 may include information associated with one or more auto-scaling groups 114. In some embodiments, account 120 my include launch configurations 122 associated with each auto-scaling group 114. Launch configurations 122 may include information associated with the provisioning of VMs 116 in each auto-scaling group 114. In some embodiments, launch configurations 122 may include information for provisioning, running, testing associated VMs 116. For example, launch configurations 122 may include information directed to an identification of the virtual machine image ("VMI ID 138") to be used during provisioning of a respective VM 116. Each VMI ID 138 corresponds to a given VMI 112 stored in virtualization manager 110. As such, when virtualization manager 110 provisions VMs 116 in auto-scaling group 114, virtualization manager 110 references respective launch instructions 122 in account 120 to identify a corresponding VMI 112 via VMI ID 138 included in launch instructions 122.

Conventionally, when virtualization platform providers update an operating system of a VMI 112, user would necessarily have to shut down each VM 116 of auto-scaling group 114, download a different version of VMI 112 from an external source, and re-provision each VM 116 of auto-scaling group 114 with the different version of VMI 112. In some embodiments, the different version of VMI 112 may be a version of VMI 112 that is prior to a current version of the AMI. In some embodiments, the different version of VMI 112 may be a version of VMI 112 that is subsequent to the current version of VMI 112. Generally, the different version of VMI 112 may be any version that different is from the current version of VMI 112.

To address this issue, virtualization manager 110 may further include an auto-hydration manager 150. Auto-hydration manager 150 is configured to provide real-time, near real-time, or periodic service to auto-scaling groups 114. Auto-hydration manager 150 may leverage information included in launch configuration 122 associated with an auto-scaling group 114 in servicing auto-scaling group 114. For example, launch confirmation 122 may further include a hydration tag 136. Hydration tag 136 may be set by a user during the initiation of launch configuration 122. Hydration tag 136 can indicate to auto-hydration manager 150 that a respective auto-scaling group 114 is a candidate for service by auto-hydration manager 150.

Figure 2:
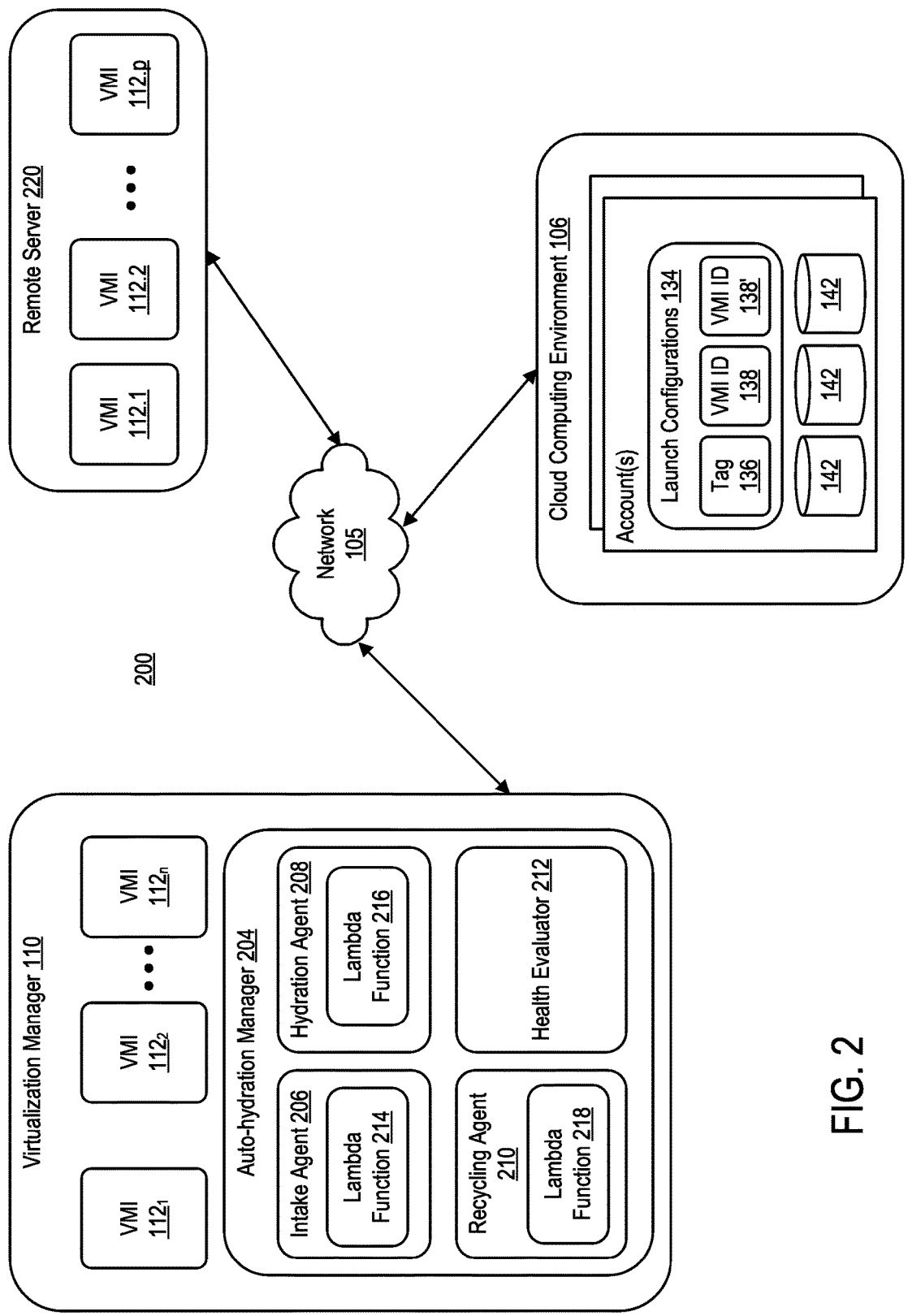
FIG. 2 is a block diagram illustrating components of the computing environment of FIG. 1 in more detail, according to one embodiment.

FIG. 2 illustrates a block diagram of a computing environment 200, according to one embodiment. Computing environment 200 can include one or more components of computing environment 100. As illustrated, computing environment 200 can include virtualization manager 110, cloud computing environment 106, and a remote server 220 communication over network 205.

Auto-hydration manager 150 of virtualization manager 150 includes an intake agent 206, a hydration agent 208, and a recycling agent 210. In some embodiments, virtualization manager 110 may further include a health evaluator 212. Each of intake agent 206, hydration agent 208, and recycling agent 210 can include a respective lambda function (e.g., lambda function 214, lambda function 216, and lambda function 218). Each lambda function can include one or more instructions to be executed by each respective agent 214. Collectively, the lambda functions work in conjunction to perform a hydration process for each auto-scaling group 114.

Hydration agent 208 can be configured to execute one or more instructions associated with lambda function 214. Lambda function 214 may include one or more instructions to identify one or more auto-scaling groups that include a hydration tag. Lambda function 214 may be initiated responsive to a user defined triggering event. In some embodiments, the user defined triggering event may include the launching of a new patch (e.g., version 2.0) for VMI 112. In some embodiments, the user defined triggering event may include the launching of an $n^{th}+1$ patch (e.g., version $n^{th}+1$). Hydration agent 208 may access launch configuration 122 associated with each auto-scaling group 114 to identify which auto-scaling groups 114 were tagged with hydration tag 136. In some embodiments, this process involves parsing launch configurations of the respective auto-scaling group 114 to identify a hydration tag 136.

Hydration agent 208 can be configured to execute one or more instructions associated with lambda function 216. Lambda function 216 can include one or more instructions to clone launch configurations associated with each auto-scaling group 114 that was determined to include a hydration tag 136. Cloning each of the one or more instructions includes hydration agent 208 uploading contents associated with each VM in a temporary bucket on cloud computing environment 106. Hydration agent 208 may further identify a version of VMI 112 that triggered the hydration process. For example, hydration agent 208 may reference remote server 220 that includes one or more versions of VMI 112. Illustratively, each the one or more version of VMI 112 are shown as VMI 112.1, VMI 112.2, . . . VMI 112.$p$ (generally referred to as VMI 112'). In some embodiments, each VMI 112' may be stored as a JavaScript Object Notation (JSON) file.

Hydration agent 208 may further create a new launch instruction (illustrated launch configuration 122') that includes substantially the same information for provisioning, running, and testing each VM as launch configuration 122. Launch instruction 122' differs from launch instruction 122 in that launch instruction 122' includes a new VMI address directed to VMI 112'. For example, assuming that that the current version of VMI 112 is VMI 112.1, and VMI 112.2 is available, the VMI ID associated with VMI 112.2 would be denoted in launch instruction 122'. Hydration agent 208 may further re-launch each VM 116 associated with the respective auto-scaling group 114 in accordance with launch instructions 122'. Accordingly, each VM 116 now includes VMI 112.

Recycling agent 210 is configured to execute one or more instructions associated with lambda function 218. Lambda function 218 includes one or more instructions directed to updating each re-launched auto-scaling group 114 with data previously contained therein. For example, recycling agent 210 may access data previously stored in one or more temporary buckets on cloud computing environment 106, and inject that data back into respective VMs 116 of auto-scaling group 114.

As previously stated, in some embodiments, auto-hydration manager 150 may further include health evaluator 212. Health evaluator 212 can be configured to work in conjunction with hydration agent 208 during re-launch of auto-scaling group 114 with VMI 122'. Health evaluator 212 may assess a health of an application (e.g., application 132) executing across VMs 116 of auto-scaling group 114. For example, health evaluator 212 may assess a health of the application by performing a health check with a load balancer (not shown), performing a health check with a virtualization manager (e.g., auto-hydration manager 150), any suitable health check process, or a combination thereof. Responsive to determining that the health of the application is positive, health evaluator 212 may not make any change to auto-scaling group 114. In some embodiments, responsive to determining that the health of the application is positive, health evaluator 212 may reduce a number of VMs 116 in auto-scaling group 114. Responsive to determining that the health of the application is negative, health evaluator 212 may add one or more VMs 116 to auto-scaling group 114. By adding one or more VMs 116 to auto-scaling group 114, health evaluator 212 provides the application with a greater number of resources.

Figure 3:
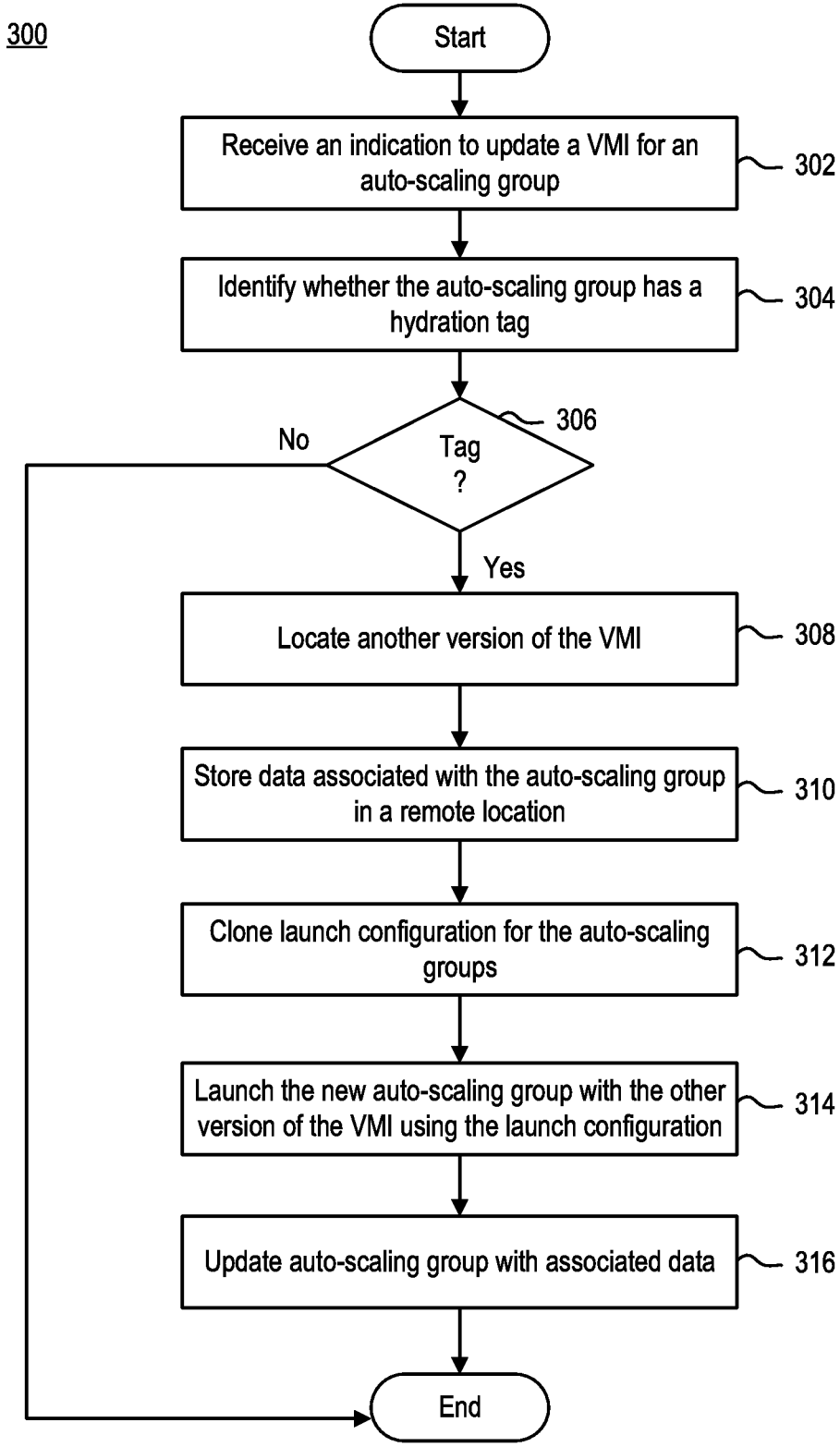
FIG. 3 is a flow diagram illustrating a method of updating an image of a virtual machine, according to one embodiment.

FIG. 3 is a flow diagram illustration a method 300 of updating a virtual machine image of virtual machines of an auto-scaling group, according to one embodiment. Although method 300 is discussed in conjunction with FIGS. 1 and 2, those skilled in the art will readily understand that method 300 may be practiced on similar architecture.

Method 300 begins at step 302. At step 302, virtualization manager 110 receives an indication to update a current VMI of an auto-scaling group. For example, virtualization manager may receive an indication to update VMI 112 of auto-scaling group 114. The indication may be triggered by virtualization manager 110 identifying a different version of VMI 112 (e.g., VMI 112') available in remote server 220. In some examples, VMI 112' is a previous version of VMI 112. In some examples, VMI 112' is an updated version of VMI 112. In some examples, VMI 112' is a most recent version of VMI 112.

At step 304, virtualization manager 110 may identify whether auto-scaling group includes a hydration tag. For example, intake agent 206 may execute one or more instructions in lambda function 214 to identify whether auto-scaling group 114 includes a hydration tag 136 in launch configurations 122. Intake agent 206 may identify hydration tag 136 by parsing launch configurations 122 associated with auto-scaling group 114. Hydration tag 136 may include, for example, instructions for how to update VMI 112. In some embodiments, hydration tag 136 may include instructions to update VMI 112 with a most recent version. In some embodiments, hydration tag 136 may include instructions to update VMI 112 with a most recent version minus one.

At step 306, virtualization manager 110 determines whether each identified auto-scaling group 114 includes a hydration tag. If at step 306, virtualization manager 114 determines that auto-scaling group 114 does not include a hydration tag, method 300 ends, and VMI 112 of auto-scaling group 114 is not update. If, however, at step 306, virtualization manager 114 determines that auto-scaling group 114 does include a hydration tag, method 300 proceeds to step 308.

At step 308, virtualization manager 110 locates a new version of VMI 112 that is different from the current version of VMI 112. For example, hydration agent 208 may execute one or more instructions in lambda function 216 to locate a new version of VMI 112 in accordance. Hydration agent 208 may identify the new version of VMI 112 in accordance with the instructions included in hydration tag 136. For example, if instructions in hydration tag 136 provide that VMI 112 is to be updated with a most recent version of VMI 112, hydration agent 208 may locate the most recent version of VMI 112 in remote server 220.

At step 310, virtualization manager 110 may store data associated with auto-scaling group 114 in a remote location. For example, hydration agent 208 may execute one or more instructions in lambda function 216 to stored data associated with each VM 116 of auto-scaling group 114 in one or more buckets 142 on cloud computing environment 106. By storing data associated with each VM 116 of auto-scaling group 114, hydration agent 208 may preserve files and applications associated with each VM 116 after replacing VMI 112 with a different version.

At step 312, virtualization manager 110 may clone launch configurations 122 associated with auto-scaling group 114. For example, hydration agent 208 may execute one or more instructions in lambda function 216 to clone launch configurations 122 for auto-scaling group 114. Cloning launching configurations 122 may include conserving provisioning, running, and testing information associated with auto-scaling group 114 in a cloned launch configurations 122'. However, rather than hydration agent 208 including VMI ID 138 of current version of VMI 112 in launch instructions 122', hydration agent 208 includes VMI ID 138' of VMI 112' in launch instructions 122'. In other words, during the cloning process, hydration agent 208 updates launch configuration 122' with VMI ID 138' corresponding to the located version of VMI 112 in step 308.

At step 314, virtualization manager 110 launches auto-scaling group 114 with a new version of VMI 112 using the updated launch configurations. For example, hydration agent 208 may provision each VM 116 in auto-scaling group 114 according to launch configurations 122'. Accordingly, auto-scaling group 114 now includes VMI 112' of each VM 116.

At step 316, virtualization manager 110 may update auto-scaling group 114 with data previously contained therein. For example, recycling agent 210 may execute one or more instructions in lambda function 218 to update each VM 116 of auto-scaling group 114 by injecting data that was previously stored in one or more buckets 142 of cloud computing environment 106 in step 310. As such, at step 316, auto-scaling group 114 is re-launched with all previous data.

Figure 4:
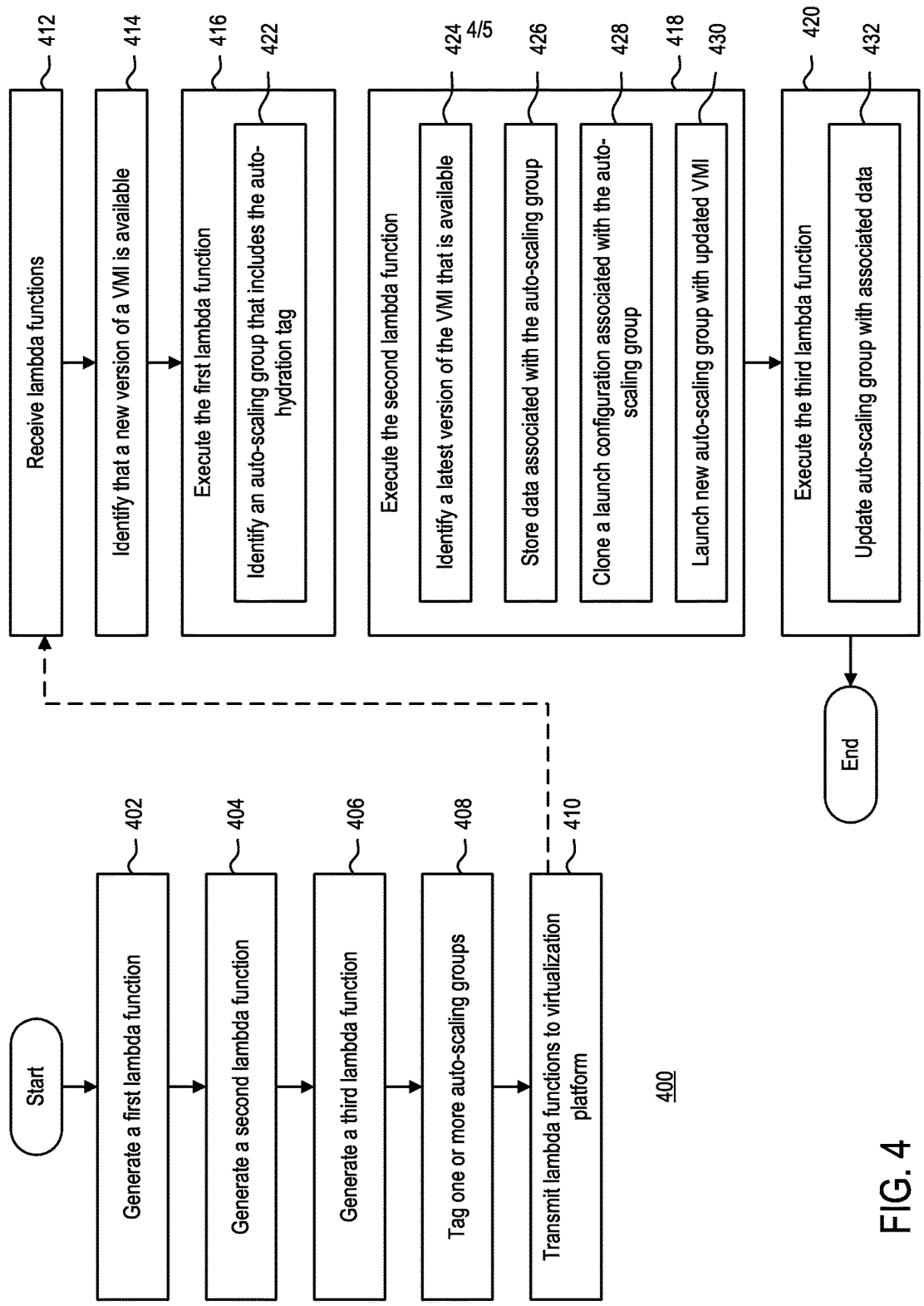
FIG. 4 is a flow diagram illustrating one-time setup and a method of updating an image of a virtual machine, according to one embodiment.

FIG. 4 is a flow diagram illustration a method 400 of updating a virtual machine image of virtual machines of an auto-scaling group, according to one embodiment. Although method 400 is discussed in conjunction with FIGS. 1 and 2, those skilled in the art will readily understand that method 400 may be practiced on similar architecture.

At step 402, client device 102 can generate a first lambda function. For example, a user accessing client device 102 may generate lambda function 214. Lambda function 214 includes one or more instructions to identify one or more auto-scaling groups that include a hydration tag. Lambda function 214 may be initiated responsive to a user defined triggering event.

At step 404, client device 102 can generate a second lambda function. For example, user accessing client device 102 may generate lambda function 216. Lambda function 216 includes one or more instructions to clone launch configurations associated with each auto-scaling group 114 that was determined to include a hydration tag 136. Cloning each of the one or more instructions includes uploading contents associated with each VM in a temporary bucket on cloud computing environment 106. Lambda function 216 may further includes instructions identify a version of the VMI that triggered the hydration process. For example, hydration agent 208 may reference remote server 220 that includes one or more versions of VMI 122.

At step 406, client device 102 generates a third lambda function. For example, user accessing client device 102 may generate lambda function 218. Lambda function 218 includes one or more instructions directed to updating each re-launched auto-scaling group 114 with data previously contained therein.

At step 408, client device 102 may tag one or more auto-scaling groups 114 in virtualization platform 104 with a hydration tag 136. For example, client device 408 may access launch configurations 122 associated with each auto-scaling group 114 to include hydration tag 136 in a respective set of launch configurations 122. Hydration tag 136 can indicate to virtualization manager 110 that a respective auto-scaling group 114 is a candidate for service by auto-hydration manager 150.

At step 410, client device 102 may transmit the lambda functions to virtualization platform 104. For example, client device 102 may transmit lambda function 214, lambda function 216, and lambda function 218 to virtualization manager 110 in virtualization platform 104 for upload.

At step 412, virtualization platform 104 receives the lambda functions from client device 102. For example, virtualization manager 110 may receive lambda function 214, lambda function 216, and lambda function 218 from client device 102.

At step 414, virtualization manager 110 identifies a triggering condition for updating a VMI of an auto-scaling group 114. For example, virtualization manager 110 may monitor remote server 220 for postings of updated versions of VMI 112. Triggering conditions for updating a VMI 112 may include: a new version of VMI 112 being uploaded to a configuration file on remote server 220, a scheduled action, and on demand execution. In some embodiments, scheduled actions and on demand execution may request a specific VMI version instead of the latest version.

Generally, the VMI update may occur if the VMI version is different from the existing VMI version.

At step 416, responsive to identifying the triggering condition, virtualization manager 110 can execute lambda function 214. For example, responsive to identifying the triggering condition exists, intake agent 206 may execute one or more instructions of lambda function 214.

Step 416 includes sub-step 422. At sub-step 422, intake agent 206 may identify one or more auto-scaling groups that include a hydration tag 122. For example, intake agent 206 may execute one or more instructions in lambda function 214 to identify whether auto-scaling group 114 includes a hydration tag 136 in launch configurations 122. Intake agent 206 may identify hydration tag 136 by parsing launch configurations 122 associated with auto-scaling group 114. Hydration tag 136 may include, for example, instructions for how to update VMI 112. In some embodiments, hydration tag 136 may include instructions to update VMI 112 with a most recent version. In some embodiments, hydration tag 136 may include instructions to update VMI 112 with a most recent version minus one.

At step 418, virtualization manager 110 executes lambda function 216. For example, hydration agent 208 may execute lambda function 216. Step 418 includes sub-steps 424-430.

At sub-step 424, virtualization manager 110 identifies a new version of VMI 112 that is different from a current version of VMI 112. For example, hydration agent 208 may execute one or more instructions in lambda function 216 to locate a new version of VMI 112 in accordance. Hydration agent 208 may identify the new version of VMI 112 in accordance with the instructions included in hydration tag 136. For example, if instructions in hydration tag 136 provide that VMI 112 is to be updated with a most recent version of VMI 112, hydration agent 208 may locate the most recent version of VMI 112 in remote server 220.

At sub-step 426, virtualization manager 110 stores data associated with each identified auto-scaling group 114 in a remote location. For example, hydration agent 208 may execute one or more instructions in lambda function 216 to stored data associated with each VM 116 of auto-scaling group 114 in one or more buckets 142 on cloud computing environment 106. By storing data associated with each VM 116 of auto-scaling group 114, hydration agent 208 may preserve files and applications associated with each VM 116 after replacing VMI 112 with a different version.

At sub-step 428, virtualization manager 110 clones can launch configurations 122 associated with identified auto-scaling group 114. For example, hydration agent 208 may execute one or more instructions in lambda function 216 to clone launch configurations 122 for auto-scaling group 114. Cloning launching configurations 122 may include conserving provisioning, running, and testing information associated with auto-scaling group 114 in a cloned launch configurations 122'. However, rather than hydration agent 208 including VMI ID 138 of current version of VMI 112 in launch instructions 122', hydration agent 208 includes VMI ID 138' of VMI 112' in launch instructions 122'.

At sub-step 430, virtualization manager 110 launches auto-scaling group 114 with updated VMI 112'. For example, hydration agent 208 may provision each VM 116 in auto-scaling group 114 according to launch configurations 122'. Accordingly, auto-scaling group 114 now includes VMI 112' of each VM 116.

At step 420, virtualization manager 110 executes lambda function 218. For example, recycling agent 210 may execute lambda function 218. Step 420 includes sub-step 432.

At sub-step 432, virtualization manager 110 may update auto-scaling group 114 with data previously contained therein. For example, recycling agent 210 may execute one or more instructions in lambda function 218 to update each VM 116 of auto-scaling group 114 by injecting data that was previously stored in one or more buckets 142 of cloud computing environment 106.

Figure 5:
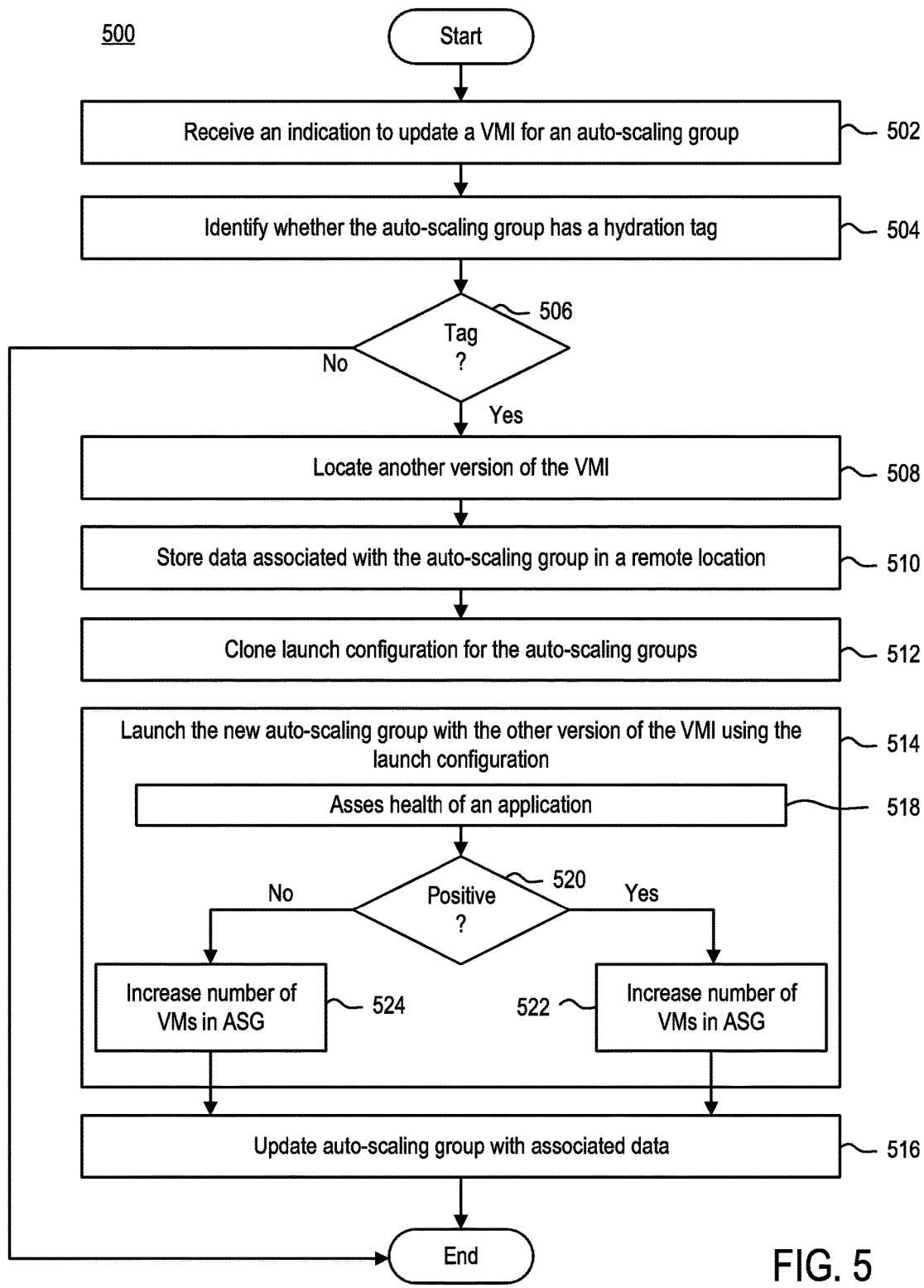
FIG. 5 is a flow diagram illustrating a method of updating an image of a virtual machine, according to one embodiment.

FIG. 5 is a flow diagram illustration a method 500 of updating a virtual machine image of virtual machines of an auto-scaling group, according to one embodiment. Although method 500 is discussed in conjunction with FIGS. 1 and 2, those skilled in the art will readily understand that method 500 may be practiced on similar architecture.

Method 500 begins at step 502. At step 502, virtualization manager 110 can receive an indication to update a current VMI of an auto-scaling group. For example, virtualization manager may receive an indication to update VMI 112 of auto-scaling group 114. The indication may be triggered by virtualization manager 110 identifying a different version of VMI 112 (e.g., VMI 112') available in remote server 220. In some examples, VMI 112' is a previous version of VMI 112. In some examples, VMI 112' is an updated version of VMI 112. In some examples, VMI 112' is a most recent version of VMI 112.

At step 504, virtualization manager 110 may identify whether auto-scaling group includes a hydration tag. For example, intake agent 206 may execute one or more instructions in lambda function 214 to identify whether auto-scaling group 114 includes a hydration tag 136 in launch configurations 122. Intake agent 206 may identify hydration tag 136 by parsing launch configurations 122 associated with auto-scaling group 114. Hydration tag 136 may include, for example, instructions for how to update VMI 112. In some embodiments, hydration tag 136 may include instructions to update VMI 112 with a most recent version. In some embodiments, hydration tag 136 may include instructions to update VMI 112 with a most recent version minus one.

At step 506, virtualization manager 110 determines whether each identified auto-scaling group 114 includes a hydration tag. If at step 506, virtualization manager 114 determines that auto-scaling group 114 does not include a hydration tag, method 500 ends, and VMI 112 of auto-scaling group 114 is not update. If, however, at step 506, virtualization manager 114 determines that auto-scaling group 114 does include a hydration tag, method 500 proceeds to step 508.

At step 508, virtualization manager 110 locates a new version of VMI 112 that is different from the current version of VMI 112. For example, hydration agent 208 may execute one or more instructions in lambda function 216 to locate a new version of VMI 112 in accordance. Hydration agent 208 may identify the new version of VMI 112 in accordance with the instructions included in hydration tag 136. For example, if instructions in hydration tag 136 provide that VMI 112 is to be updated with a most recent version of VMI 112, hydration agent 208 may locate the most recent version of VMI 112 in remote server 220.

At step 510, virtualization manager 110 may store data associated with auto-scaling group 114 in a remote location. For example, hydration agent 208 may execute one or more instructions in lambda function 216 to stored data associated with each VM 116 of auto-scaling group 114 in one or more buckets 142 on cloud computing environment 106. By storing data associated with each VM 116 of auto-scaling group 114, hydration agent 208 may preserve files and applications associated with each VM 116 after replacing VMI 112 with a different version.

At step 512, virtualization manager 110 may clone launch configurations 122 associated with auto-scaling group 114. For example, hydration agent 208 may execute one or more instructions in lambda function 216 to clone launch configurations 122 for auto-scaling group 114. Cloning launching configurations 122 may include conserving provisioning, running, and testing information associated with auto-scaling group 114 in a cloned launch configurations 122'. However, rather than hydration agent 208 including VMI ID 138 of current version of VMI 112 in launch instructions 122', hydration agent 208 includes VMI ID 138' of VMI 112' in launch instructions 122'. In other words, during the cloning process, hydration agent 208 updates launch configuration 122' with VMI ID 138' corresponding to the located version of VMI 112 in step 508.

At step 514, virtualization manager 110 launches auto-scaling group 114 with a new version of VMI 112 using the updated launch configurations. For example, hydration agent 208 may provision each VM 116 in auto-scaling group 114 according to launch configurations 122'. Accordingly, auto-scaling group 114 now includes VMI 112' of each VM 116.

In some embodiments, step 514 includes sub-steps 518-522. At sub-step 518, virtualization manager 110 assesses a health of an application executing across VMs 116 of auto-scaling group 114. Health evaluator 212 is configured to work in conjunction with hydration agent 208 during re-launch of auto-scaling group 114 with VMI 122'. Health evaluator 212 may assess a health of an application executing across VMs 116 of auto-scaling group 114. For example, health evaluator 212 may assess a health of the application by performing a health check with a load balancer (not shown), performing a health check with a virtualization manager (e.g., auto-hydration manager 150), any suitable health check process, or a combination thereof.

At sub-step 520, virtualization manager 110 determines whether the health of an application is positive. If, at step 520, virtualization manager 110 determines that the health of the health of the application executing across VMs 116 of auto-scaling group 114 is positive, then at step 522, virtualization manager 110 does not increase a number of VMs 116 in auto-scaling group 114. In some embodiments, responsive to detective a positive health, virtualization manager 110 may decrease a number of VMs 116 in auto-scaling group 114.

If, however, at step 520, virtualization manager 110 determines that the health of an application is negative, at step 524 virtualization manager 110 increases a number of VMs 116 in auto-scaling group. By increasing the number of VMs 116 in auto-scaling group 114, virtualization manager 110 increase the number of resources available to application executing in auto-scaling group 114, thus increasing the health of the application.

At step 516, virtualization manager 110 may update auto-scaling group 114 with data previously contained therein. For example, recycling agent 210 may execute one or more instructions in lambda function 218 to update each VM 116 of auto-scaling group 114 by injecting data that was previously stored in one or more buckets 142 of cloud computing environment 106. As such, at step 516, auto-scaling group 114 is re-launched with all previous data.

While the foregoing is directed to embodiment described herein, other and further embodiments may be devised without departing from the basic scope thereof. For example, aspects of the present disclosure may be implemented in hardware or software or a combination of hardware and software. One embodiment described herein may be implemented as a program product for use with a computer system. The program(s) of the program product define functions of the embodiments (including the methods described herein) and can be contained on a variety of computer-readable storage media. Illustrative computer-readable storage media include, but are not limited to: (i) non-writable storage media (e.g., read-only memory (ROM) devices within a computer, such as CD-ROM disks readably by a CD-ROM drive, flash memory, ROM chips, or any type of solid-state non-volatile memory) on which information is permanently stored; and (ii) writable storage media (e.g., floppy disks within a diskette drive or hard-disk drive or any type of solid state random-access memory) on which alterable information is stored. Such computer-readable storage media, when carrying computer-readable instructions that direct the functions of the disclosed embodiments, are embodiments of the present disclosure.

It will be appreciated to those skilled in the art that the preceding examples are exemplary and not limiting. It is intended that all permutations, enhancements, equivalents, and improvements thereto are apparent to those skilled in the art upon a reading of the specification and a study of the drawings are included within the true spirit and scope of the present disclosure. It is therefore intended that the following appended claims include all such modifications, permutations, and equivalents as fall within the true spirit and scope of these teachings.

What is claimed:

1. A method of generating an auto-scaling group, comprising:
   identifying that a second virtual machine image exists for a plurality of virtual machines in an auto-scaling group;
   determining that a first auto-scaling group is pre-configured with instructions to automatically update a first virtual machine image associated with the plurality of virtual machines with the second virtual machine image when the second virtual machine image becomes available;
   updating the first virtual machine image associated with the plurality of virtual machines with the second virtual machine image;
   launching a second auto-scaling group instance using the second virtual machine image; and
   redirecting traffic associated with the first auto-scaling group to the second auto-scaling group instance.

2. The method of claim 1, further comprising:
   cloning launch configurations associated with the first auto-scaling group prior to updating the first virtual machine image with the second virtual machine image.

3. The method of claim 2, wherein launching the second auto-scaling group instance using the second virtual machine image, comprises:
   launching the second auto-scaling group in accordance with the cloned launch configurations.

4. The method of claim 1, wherein the operation further comprises:
   assessing a health of an application executing across the plurality virtual machines of the first auto-scaling group;
   determining that the application is exhibiting a negative health; and
   increasing a number of virtual machines in the second auto-scaling group instance.

5. The method of claim 1, wherein the operation further comprises:
   assessing a health of an application executing across the plurality virtual machines of the first auto-scaling group;
   determining that the application is exhibiting a positive health; and
   decreasing a number of virtual machines in the second auto-scaling group instance.

6. The method of claim 1, wherein updating the first virtual machine image associated with the plurality of virtual machines with the second virtual machine image, comprises:
   locating a JavaScript Objection Notation (JSON) file mapping all prior and subsequent versions of the first virtual machine image; and
   tracing the mapping to a prior version of the first virtual machine image.

7. The method of claim 1, wherein updating the first virtual machine image associated with the plurality of virtual machines with the second virtual machine image, comprises:
   locating a JavaScript Objection Notation (JSON) file mapping all prior and subsequent versions of the first virtual machine image; and
   tracing the mapping to a new version of the first virtual machine image.

8. A non-transitory computer readable medium including one or more sequences of instructions which, when executed by one or more processors, causes the one or more processors to perform operations, comprising:
   identifying a first auto-scaling group comprising a plurality of virtual machines having a first virtual machine image associated therewith;

identifying that a second virtual machine image exists for the plurality of virtual machines in the first auto-scaling group;

determining that the first auto-scaling group is pre-configured with instructions to automatically update the first virtual machine image associated with the plurality of virtual machines with the second virtual machine image when the second virtual machine image becomes available;

updating the first virtual machine image associated with the plurality of virtual machines with the second virtual machine image;

launching a second auto-scaling group instance using the second virtual machine image; and redirecting traffic associated with the first auto-scaling group to the second auto-scaling group instance.

9. The non-transitory computer readable medium of claim 8, further comprising:

cloning launch configurations associated with the first auto-scaling group prior to updating the first virtual machine image with the second virtual machine image.

10. The non-transitory computer readable medium of claim 9, wherein launching the second auto-scaling group instance using the second virtual machine image, comprises:

launching the second auto-scaling group in accordance with the cloned launch configurations.

11. The non-transitory computer readable medium of claim 8, wherein the operation further comprises:

assessing a health of an application executing across the plurality virtual machines of the first auto-scaling group;

determining that the application is exhibiting a negative health; and increasing a number of virtual machines in the second auto-scaling group instance.

12. The non-transitory computer readable medium of claim 8, wherein the operation further comprises:

assessing a health of an application executing across the plurality virtual machines of the first auto-scaling group;

determining that the application is exhibiting a positive health; and decreasing a number of virtual machines in the second auto-scaling group instance.

13. The non-transitory computer readable medium of claim 8, wherein updating the first virtual machine image associated with the plurality of virtual machines with the second virtual machine image, comprises:

locating a JavaScript Objection Notation (JSON) file mapping all prior and subsequent versions of the first virtual machine image; and tracing the mapping to a prior version of the first virtual machine image.

14. The non-transitory computer readable medium of claim 8, wherein updating the first virtual machine image associated with the plurality of virtual machines with the second virtual machine image, comprises:

locating a JavaScript Objection Notation (JSON) file mapping all prior and subsequent versions of the first virtual machine image; and tracing the mapping to a new version of the first virtual machine image.

15. A system, comprising:

a processor; and a memory having programming instructions stored thereon, which, when executed by the processor, perform one or more operations, comprising:

identifying that a second virtual machine image exists for a plurality of virtual machines in an auto-scaling group;

determining that a first auto-scaling group is pre-configured with instructions to automatically update a first virtual machine image associated with the plurality of virtual machines with the second virtual machine image when the second virtual machine image becomes available;

updating the first virtual machine image associated with the plurality of virtual machines with the second virtual machine image;

launching a second auto-scaling group instance using the second virtual machine image; and redirecting traffic associated with the first auto-scaling group to the second auto-scaling group instance.

16. The system of claim 15, wherein the one or more operations further comprise:

cloning launch configurations associated with the first auto-scaling group prior to updating the first virtual machine image with the second virtual machine image.

17. The system of claim 16, wherein launching the second auto-scaling group instance using the second virtual machine image, comprises:

launching the second auto-scaling group in accordance with the cloned launch configurations.

18. The system of claim 15, wherein the one or more operations further comprise:

assessing a health of an application executing across the plurality virtual machines of the first auto-scaling group;

determining that the application is exhibiting a negative health; and increasing a number of virtual machines in the second auto-scaling group instance.

19. The system of claim 15, wherein the one or more operations further comprise:

assessing a health of an application executing across the plurality virtual machines of the first auto-scaling group;

determining that the application is exhibiting a positive health; and decreasing a number of virtual machines in the second auto-scaling group instance.

20. The system of claim 16, wherein updating the first virtual machine image associated with the plurality of virtual machines with the second virtual machine image, comprises:

locating a JavaScript Objection Notation (JSON) file mapping all prior and subsequent versions of the first virtual machine image; and tracing the mapping to one of a prior version of the first virtual machine image or a new version of the first virtual machine image.

* * * * *